March 2, 1965 R. N. WHEELER ET AL 3,171,903

MAGNETIC TRANSDUCER ASSEMBLY

Filed Nov. 21, 1960 3 Sheets-Sheet 1

ROBERT N. WHEELER &
JOHN BEUMER JR.
INVENTORS

BY Nathan N. Kallman

ATTORNEY

March 2, 1965 R. N. WHEELER ET AL 3,171,903
MAGNETIC TRANSDUCER ASSEMBLY
Filed Nov. 21, 1960 3 Sheets-Sheet 2

ROBERT N. WHEELER &
JOHN BEUMER JR.
INVENTORS

BY Nathan N. Kallman

ATTORNEY

March 2, 1965 R. N. WHEELER ET AL 3,171,903

MAGNETIC TRANSDUCER ASSEMBLY

Filed Nov. 21, 1960 3 Sheets-Sheet 3

ROBERT N. WHEELER &
JOHN BEUMER JR.
INVENTORS

BY Nathan N. Kallman

ATTORNEY 3,171,903

MAGNETIC TRANSDUCER ASSEMBLY

Robert N. Wheeler, Redwood City, and John Beumer, Jr., Fremont, Calif., assignors to Ampex Corporation, Redwood City, Calif., a corporation of California Filed Nov. 21, 1960, Ser. No. 70,782
4 Claims. (Cl. 179—100.2)

This invention relates to an improved magnetic transducer assembly, and in particular to a novel arrangement and improved support means for a magnetic transducer.

As presently known, many types of magnetic transducers or heads comprise a magnetic core having a nonmagnetic gap, and magnetic pole pieces intimately connected to the core on either side of the gap. As is well known, magnetic tape recording and playback cause wear of the pole pieces, and replacement of the entire head assembly is required at intervals. Replacement of the entire head assembly involves the alignment of cooperating parts and many adjustments, thus making maintenance of the magnetic tape apparatus unduly expensive and time consuming. Also in magnetic tape apparatus utilizing a rotary drum carrying a plurality of heads, it may be necessary to replace an entire drum assembly.

Furthermore, in order to test the electrical characteristics of magnetic transducers prior to shipment, it is usually necessary at first to assemble the transducers with the tape apparatus and then operate the apparatus. If any transducer assembly does not meet the required specifications, the entire transducer assembly must be removed from the apparatus, and another transducer assembly substituted for another test run. Substitution of one transducer assembly for another may introduce undesirable variations in the physical relationships of the components of the apparatus, and further adjustment may be needed.

An object of this invention is to provide an improved magnetic transducer assembly.

Another object of this invention is to provide a magnetic transducer assembly having a novel arrangement and improved support means.

Another object of this invention is to provide a magnetic head assembly having separate supports for a magnetic core and pole pieces so that replacement when necessary may be made in a simple manner.

Another object is to provide a magnetic head assembly wherein testing may be made at an early stage in manufacturing to provide uniformity and standardization of parts, resulting in reduced assembly costs.

According to this invention, a magnetic transducer assembly comprises a holder for a magnetic core, and a separate support for magnetic pole pieces which form a transducing gap. The core holder and the pole piece support are assembled in a predetermined relationship by mechanical means, and are joined so that the magnetic core is spaced from the pole pieces by an electrically insulating nonmagnetic member. The magnetic core is securely fastened in a fixed position in the core holder, while the magnetic pole pieces are secured firmly in a predetermined relation within the pole piece support. When the core holder and pole piece support are assembled, the uppermost portion of the core is positioned with reference to the lowermost portion of the transducing gap and relative to a movable magnetic medium or tape so as to provide optimum performance during the recording and reproducing modes.

For reducing losses caused by stray flux, a nonmagnetic conductive shield is set in a gap of the core to develop eddy currents which provide a counter magnetomotive force. In addition, a projecting electrical terminal is fixed in insulating relationship within the core holder to provide an external electrical connection for signal conduction which also affords a means for testing the electrical characteristics of the transducer prior to installation in a magnetic tape apparatus.

The invention will be described in greater detail with reference to the drawing in which.

Like reference numerals are employed to indicate like parts throughout the drawing.

Figures 1, 2, 3:
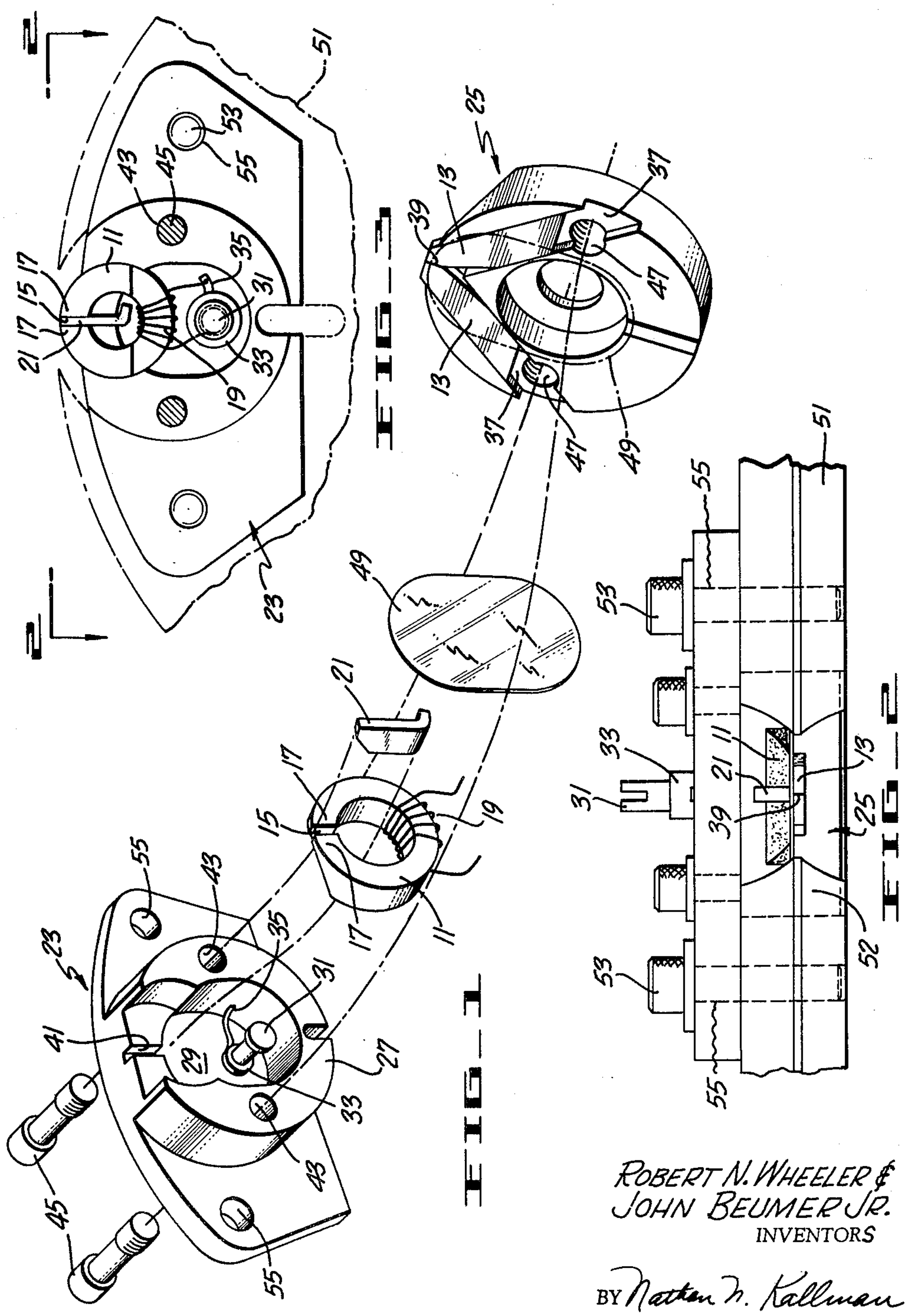
FIGURE 1 is an exploded view in perspective of a magnetic transducer assembly, in accordance with the invention.
FIGURE 2 is an elevational view, taken in the plane represented by line 2—2 of FIGURE 3, showing an assembled transducer of the invention.
FIGURE 3 is a partial plan view of a rotary drum used in magnetic tape apparatus with a magnetic transducer assembly mounted thereon, having the pole piece support and insulating spacer removed.

As illustrated in FIGURES 1–5 of the drawing, a magnetic transducer assembly comprises a magnetic core 11, which may be formed from ferrite, and a pair of magnetic pole pieces 13, which may be formed from Alfenol or Thermanol for example.

Alfenol pole pieces are preferably utilized because the wear characteristics are better than other presently known magnetically soft materials. However, for high frequency application, such as in the 5–6 megacycle range, the conductive Alfenol has poor magnetic properties having a permeability of about 95 on the average. Therefore, the ferrite which has a relatively high permeability of about 250 at such high frequencies is employed in the core to complement the Alfenol for transducing signal information.

The magnetic core 11, which is annular in form, has a gap 15 formed therein thereby providing spaced polar ends 17 at which magnetic flux lines are developed. The width of the core gap 15 is made as small as manufacturing capabilities will allow, and may be .020 inch for example. The core 11 supports a coil 19 which is wound around one portion of the core for transducing electrical energy to magnetic energy and vice versa.

Disposed within the core gap 15 between the poles 17 is a metallic conducting shield 21, which may be copper, wherein eddy currents are developed. During recording and reproducing, flux lines are developed at the core gap 15. Magnetic flux which tends to pass between portions of the core 11 causes eddy currents to be developed in the highly conducting metal shield 21. As eddy currents appear in the shield 21, a counter magnetomotive force is established thus presenting a high reluctance path to stray flux lines. Such flux lines seek the path of least reluctance, and in this embodiment of the invention are directed to the pair of Alfenol pole pieces 13 adjacent to and spaced from the core 11. In this manner, the flux lines developed at the core 11 by virtue of an electrical signal applied to the coil 19 are directed to an "easy" path of flow found in the pair of magnetic pole pieces 13, which are spaced from the core 11.

In accordance with this invention, there is provided a holder 23 for maintaining the core assembly 11, and a separate support 25 for securing the pole pieces 13 in a fixed predetermined position. The core holder 23, which may be formed by die casting aluminum and precision machining, has an annular-type raised portion or land 27 on one surface. The land 27 encloses a cavity 29 having a configuration closely fitting the magnetic core 11, and within the cavity 29, there is an electrically conducting terminal 31 which projects transversely through the core holder 23. Surrounding the cylindrical portion of the "feed-through" terminal 31 is an insulating Teflon sleeve 33 passing through the holder 23.

One end of the coil 19 is connected to the conducting terminal 31, and the other end is connected to a conducting lead 35 which is clamped around the insulating sleeve 33 and contacts the metal core holder 23. The lead 35 serves to provide a reference potential such as ground when electrical signals are applied to the coil 19 by means of the projecting terminal 31.

In accordance with this invention, the separable pole piece support 25 which may be made of a machined brass disk is provided to securely maintain the Alfenol pole pieces 13 in a fixed position. The brass disk support 25 has a pair of angularly disposed grooves 37 which provide a close fit for the pole pieces 13. The grooves 37 cause the pole pieces 13 to be set at a precise angle, for example 90° as illustrated, so that the pole pieces 13 define a narrow nonmagnetic gap 39 which projects from the periphery of the pole piece support 25. During assembly, the pole pieces 13 are fixed in the grooves 37 by means of an epoxy resin, after the pole pieces 13 have been positioned with relation to a reference surface which aligns the tips of the pole pieces. A very thin strip of nonmagnetic material, such as a 100 microinch platinum foil, may be inserted between the pole piece tips within the nonmagnetic gap 39.

Similarly, the core 11 is fixed in the upper portion of the core holder cavity 29 by an epoxy resin. Prior to such fixing, the eddy current shield 21 which may be fixed in the core gap 15 by epoxy is set into a channel or slot 41 formed in the body of the holder 21 so that the core 11 is aligned in close fitting relation with the upper portion of the land 27. With the core 11 in proper position, and the coil 19 wired to the terminal 31 and lead 35 respectively, the cavity 29 is filled with an epoxy resin which fixes the core 11 securely in place. Any excess epoxy is removed by polishing or lapping so that a smooth surface even with the top of the land 27 is presented.

The land 27 forming a part of the integral core holder 23 contains a pair of clearance screw receptacles 43 which are precisely machined and spaced so that the cooperating pole piece support 25 may be joined to the core holder 23 in a predetermined relationship. The pole piece support 25 is mechanically connected to the core holder 23 by knurled screws 45 which pass through the screw receptacles 43 and engage a pair of threaded receptacles 47 formed in the pole piece support 25.

However, in order to prevent any circuit shorting which may result from erratic contact between the core holder 23 and eddy current shield 21 and the pole piece support 31, an electrically insulating nonmagnetic member 49, such as a .0005 inch strip of Mylar, is inserted between the core holder 23 and pole piece support 25 so that there is no chance for the pole pieces 13 or the pole piece support 25 to make electrical contact with either the shield 21 or the metal core holder 23. The Mylar spacer 49 is joined to the top surface of the land 27 by an adhesive prior to assembling the holder 23 and the core 11 to the support 25 carrying the pole pieces 13 by means of the screws 45.

In FIGURES 2 and 3, a magnetic transducer assembly, according to the invention, is shown mounted to a portion of a rotary drum 51 utilized in certain types of known magnetic tape apparatus. The transducer assembly is mounted in a recess 52 of the drum 51 by means of screws 53 threaded through apertures 55 so that the pole tips 13 project about .003 inch from the periphery of the drum 51. In FIGURE 2, the electrical terminal 31 is clearly shown as it projects for easy access for wiring thus affording easy convenient connection to external signal processing equipment, in addition to allowing electrical testing of the transducer assembly prior to mounting on the rotary drum 51.

In FIGURE 3, a core holder 23 and core 11 is shown mounted on a portion of the rotary drum 51 with the pole piece support 25 removed. The connections of the coil 19 to the conducting terminal 31 and the ground lead 35 are clearly illustrated.

Figures 4, 5:
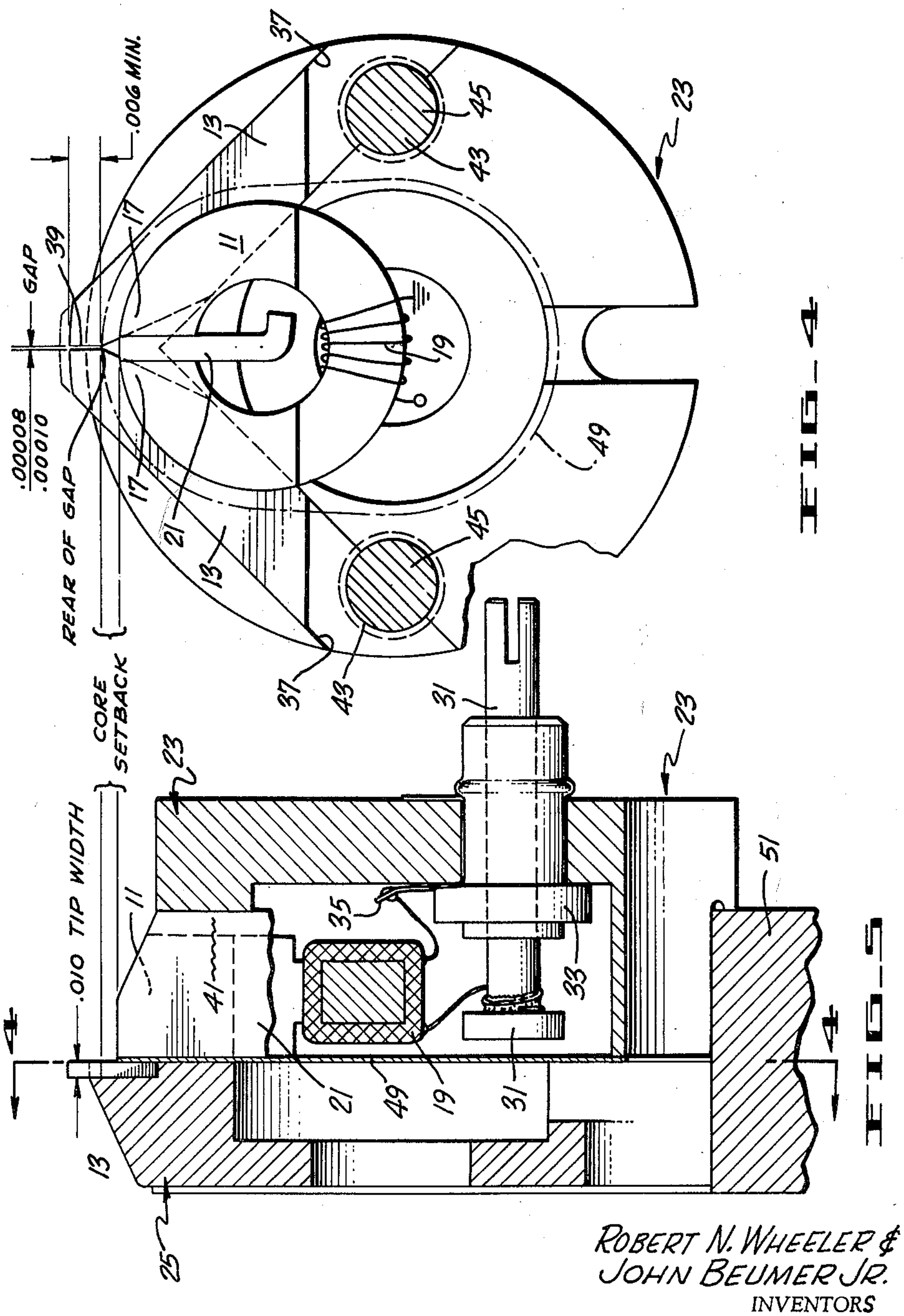
FIGURE 4 is a plan view of a magnetic core assembly and a pole piece assembly used in this invention.
FIGURE 5 is a side elevational view, in section, showing the assembled transducer.

FIGURES 4 and 5 illustrate the relation of the core position with respect to the angularly disposed pole pieces 13 and the transducing gap 39. The lowermost portion or rear of the gap 39 is spaced vertically from the uppermost portion or nose of the core 11 to provide a spacing designated as a "core setback" which affords optimum performance. The core setback relative to the pole pieces 13 is such that the flux developed at the core gap 15 does not provide erasure of signal information recorded on a magnetic medium or tape (not shown) which traverses the transducing gap 39. Furthermore, the core setback must be such that the core gap 15 is sufficiently close to the transducing gap 39 so that there is an efficient transfer of magnetic flux energy between the two gaps. By ways of example, a core setback of about .005 inch was employed with successful results.

Figure 6:
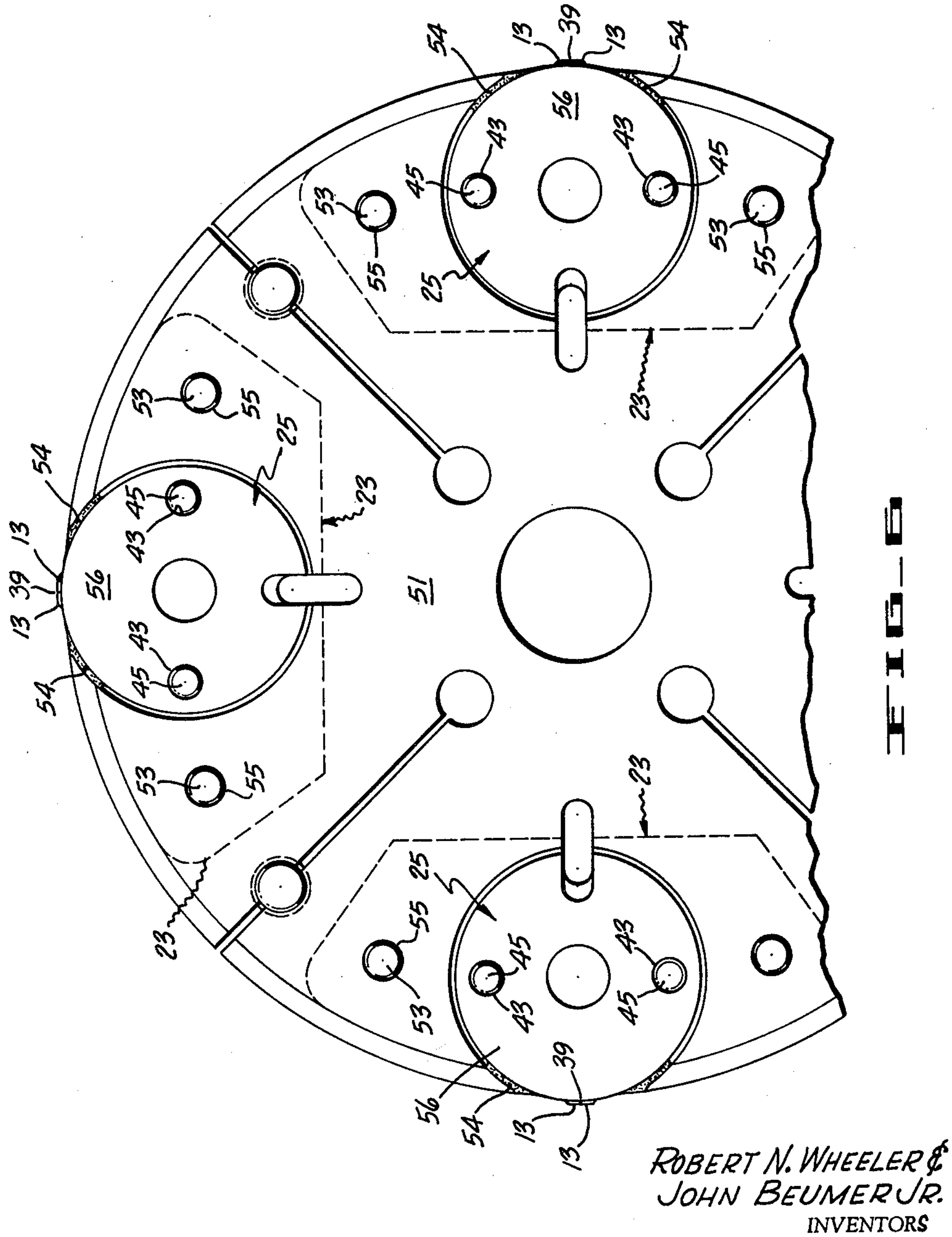
FIGURE 6 is a plan view, partly broken away, of a rotary drum carrying a plurality of assembled transducers, according to the invention.

In FIGURE 6, the rotary drum 51 with a portion removed is shown with a plurality of transducer assemblies 56, each including a core holder 23 and a pole piece support 31. Since the transducer assemblies 56 are all standardized, both physically and electrically, replacement of one transducer assembly 56 with any other standardized assembly, according to the invention, may be made without unfavorably affecting the performance of a magnetic tape apparatus.

As is well known, all the pole piece tips 13 project from the periphery of the rotary drum 51 by an amount which is held to a very narrow prescribed tolerance, such as .0005 inch for example. To prevent any snagging of the magnetic tape by the projecting pole tips 13 during operation of the tape apparatus, an epoxy filled with glass powder, for example, may be inserted in a narrow recessed space 54 adjacent to the transducer assembly 56 and near the periphery of the drum 51 so that there is no extensive abrupt hiatus between the protruding tips 13 and the drum perimeter. Since the transducer assemblies 56 are all mounted in similar mechanical configurations having close tolerances and precise alignment, the similar pole piece tips 13 tend to wear substantially at the same rate. This results in better recording and reproducing operations with a high order of resolution.

The invention has been described with respect to one embodiment. However, it is understood that the invention is not limited to the materials or dimensions recited herein. The scope of the invention encompasses generally any transducer assembly having the specified relationships with respect to a separate holder for a magnetic core, a separate support for magnetic pole pieces, and an insulating nonmagnetic spacer spacing the holder and core from the support carrying the pole pieces.

There has been described herein a magnetic transducer assembly having separable supports for a magnetic core and magnetic pole pieces, with an eddy current shield disposed within the core, an insulating spacer which precludes circuit shorting positioned between the core and the pole pieces, and an electrical terminal projecting from the assembly for making external electrical connections facile.

What is claimed is:

1. A magnetic transducer assembly comprising: a drum; a metal core holder having a land on one surface thereof and separable from said drum; a magnetic core fixed within a cavity defined by said land; an electrical terminal projecting through said holder, one end of said terminal being within the cavity defined by said land closely spaced from said magnetic core; a coil wound about said core, one end of said coil being coupled to said terminal and the other end of said coil being coupled to a source of reference potential; a metal disk-like support having conjoining grooves formed in one surface thereof and separable from said drum; a pair of pole pieces secured within said grooves and forming a transducing gap at the periphery of said support, said pole pieces magnetically coupled to said core; an insulating nonmagnetic member disposed between said core holder and said support for preventing circuit shorting; and mechanical means for joining said holder and said support in spaced relationship and for securing them to said drum.

2. A magnetic transducer assembly comprising: a drum; a metallic core holder having an arcuate land on one surface thereof and separable from said drum; a ferrite core fixed within the confines of said land; a conducting terminal projecting through said holder, said terminal being insulated from said holder; a coil wound about said core, one end of said coil being coupled to said terminal and the other end of said coil being coupled to ground; a metal disk-like support for magnetic pole pieces having conjoining grooves formed in one surface thereof and separable from said drum; a pair of magnetic pole pieces secured within said grooves and forming a transducing gap at the periphery of said support, said pole pieces magnetically coupled to said core; an insulating nonmagnetic member disposed between said core holder and said support for preventing circuit shorting; and means for joining said holder, said support and said member in a predetermined relationship and for securing them to said drum.

3. A magnetic transducer assembly comprising: a drum; a metal core holder having a raised portion on one surface thereof; a magnetic core fixed within the confines of said raised portion; a nonmagnetic shield for preventing eddy current losses having a portion positioned in a close fitting channel formed in said holder and a portion fixed in a gap formed in said core; an electrical terminal projecting through said holder; a coil wound about said core, one end of said coil being coupled to said terminal and the other end of said coil being coupled to ground; a metal disk-like support for magnetic pole pieces having conjoining grooves formed in one surface thereof; a pair of magnetic pole pieces secured within said grooves and forming a transducing gap at the periphery of said support, said pole pieces magnetically coupled to said core; an insulating nonmagnetic member disposed between said core holder and said support for preventing circuit shorting; and means for joining said holder, said support, said core, said shield, said pole pieces and said member in a predetermined relationship and for securing them to said drum.

4. A magnetic transducer assembly comprising: a magnetic core having a core gap in one portion thereof defining polar ends; a conducting shield disposed in said gap; a conductive core and said shield holder for holding said magnetic core in a predetermined fixed position; a pair of magnetic pole pieces angularly disposed for forming a transducing gap, said magnetic pole pieces coupled to said core gap; a conductive pole piece support for supporting said pole pieces in a predetermined fixed configuration; an insulating means for insulating said shield from said pole piece support; mechanical means for joining said holder and said support in a predetermined relation whereby the spacing between the uppermost part of said core portion having the polar ends is at a predetermined fixed distance from the lowermost portion of said transducing gap; said insulating means, said core, said pole pieces, said pole piece support and said core holder separable from said mechanical means; and a drum means for supporting the assembly of said conducting shield, said core holder, said pole piece support, said mechanical means, said core and said pole pieces.

References Cited by the Examiner

UNITED STATES PATENTS

| | | | |
|---|---|---|---|
| 2,860,191 | 11/58 | Runge | 179—100.2 |
| 2,866,011 | 12/58 | Kornei | 179—100.2 |
| 2,912,515 | 11/59 | Lufcy | 179—100.2 |
| 2,912,517 | 11/59 | Pfost | 179—100.2 |
| 3,020,359 | 2/62 | Pfost | 179—100.2 |

FOREIGN PATENTS

| | | |
|---|---|---|
| 1,055,860 | 10/53 | France. |
| 899,564 | 12/53 | Germany. |
| 737,323 | 9/55 | Great Britain. |
| 820,201 | 9/59 | Great Britain. |
| 830,124 | 3/60 | Great Britain. |

IRVING L. SRAGOW, *Primary Examiner.*

NEWTON N. LOVEWELL, *Examiner.*

UNITED STATES PATENT OFFICE
CERTIFICATE OF CORRECTION

Patent No. 3,171,903 — March 2, 1965

Robert N. Wheeler et al.

It is hereby certified that error appears in the above numbered patent requiring correction and that the said Letters Patent should read as corrected below.

Column 6, line 10, strike out "and said shield" and insert the same after "core" in line 11, same column 6.

Signed and sealed this 24th day of August 1965.

(SEAL)
Attest:

ERNEST W. SWIDER
Attesting Officer

EDWARD J. BRENNER
Commissioner of Patents